United States Patent Office 2,949,483
Patented Aug. 16, 1960

2,949,483

METHOD OF PURIFYING AROMATIC DICARBOXYLIC ACIDS

George E. Ham, Decatur, Ala., assignor to The Chemstrand Corporation, Decatur, Ala., a corporation of Delaware No Drawing. Filed July 30, 1954, Ser. No. 446,962

13 Claims. (Cl. 260—516)

This invention relates to a new method for purifying aromatic dicarboxylic acids. More particularly, the invention is concerned with a new method for purifying aromatic dicarboxylic acids by means of recrystallization solvents, said acids being those which may be employed in the manufacture of fiber- and filament-forming polyesters and copolyesters.

In recent years various aromatic dicarboxylic acids, such as terephthalic acid, p,p'-dicarboxybiphenyl, p,p'-dicarboxythiocarbanilide, etc., have increased considerably in commercial importance in view of the fact that these acids, when in a pure state, are capable of entering into a condensation polymerization reaction with various glycols, such as ethylene glycol, and the like, to form compositions which in turn are capable of being formed into fibers and filaments. The filaments thus produced, are capable of being cold-drawn and have many commercial applications.

In order to form condensation polymerization products or polyesters which are capable of producing fibers and filaments which in turn are capable of being cold-drawn, it has been found that the dibasic acids employed must be in a pure state in order to achieve the sought for desirable properties. However, due to insolubility of most of the dibasic acids in common solvents, it has been difficult to effect purification of the acids by normal recrystallization procedures. For example, terephthalic acid, which is the acid most frequently employed in condensation polymerization reactions, usually contains varying amounts of p-toluic acid, and also isophthalic acid, residual catalyst, and colored oxidation products, which are exceedingly difficult to separate therefrom. For example, the similarity between terephthalic acid and p-toluic acid, with respect to chemical and physical properties, make them difficult to separate by conventional methods. The high boiling points and slight solubility of the two acids make physical separations difficult. Chemical methods of purification of the aromatic dibasic acids which have been employed heretofore have not been entirely satisfactory due principally to economic reasons.

Various procedures which have been proposed for the purification of aromatic dicarboxylic acids suitable for condensation polymerizations to produce fiber- and filament-forming materials, have involved conversion of the acid to an ester and since the esters have a much wider range of solubility, they are much more easily purified than the acid. For example, one method of separating terephthalic acid from isophthalic acid involves forming the alkyl esters of the acids, fractionating the esters and saponifying the ester fractions. Ordinarily the dimethyl esters are used to effect separation in this manner. However, these methods of ester conversion are expensive on a commercial scale because of requirement of stainless steel pressure equipment, low equipment capacity, etc.

Therefore, there has been a great desire in the art to find other means for the purification of aromatic dicarboxylic acids, which are suitable for condensation polymerizations, which methods are simpler in their operation and more beneficial from an economic standpoint.

Accordingly, it is a primary object of the present invention to provide a new method for purifying aromatic dicarboxylic acids which overcomes the difficulties heretofore encountered in employing prior art procedures, said acids being those suitable for condensation polymerizations from the products of which, fibers and filaments can be formed which are capable of being cold-drawn. Other objects and advantages of the instant invention will in part appear and will in part be apparent from the description thereof hereinafter.

It has unexpectedly been found that N-methylpyrrolidone, 1,5-dimethylpyrrolidone, N-methylpiperidone and N-methylcaprolactam are solvents at elevated temperatures for various aromatic dicarboxylic acids useful in condensation polymerizations. It has further been found that these aromatic dicarboxylic acids, defined more specifically hereinafter, can be purified to a highly pure state by recrystallizing them from N-methylpyrrolidone, 1,5-dimethylpyrrolidone, N-methylpiperidone, or N-methylcaprolactam. By way of definition, it should be pointed out that the recrystallization solvents, useful in the practice of the present invention, have the following structural formulas:

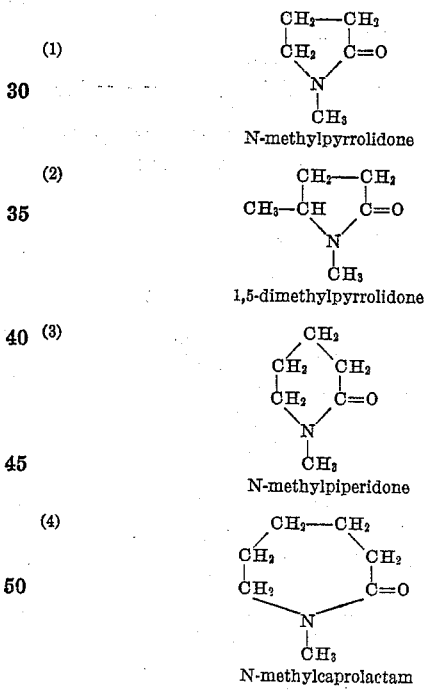

The objects of the present invention are in general accomplished by dissolving the crude aromatic dicarboxylic acid in N-methylpyrrolidone, 1,5-dimethylpyrrolidone, N-methylpiperidone or N-methylcaprolactam at elevated emperatures. Thereafter the solution is cooled and the crystalline product formed on cooling is a salt or complex formed between the solvent and the particular aromatic dibasic acid being purified. The salt is recovered by filtration and then washed with hot water to regenerate the purified dibasic acid which is thereafter dried. Of course, normal washing prior to drying of the purified acid with a non-solvent therefor may be employed to remove any recrystallization solvent therefrom. The complex formed between the solvent and the dibasic acid has been found to contain 2 moles of solvent for each mole of acid in all cases.

The aromatic dicarboxylic acids which may be purified in accordance with the present invention are those having the general formula:

wherein $n$ is an integer from zero to one, inclusive, and R is a radical selected from the group of

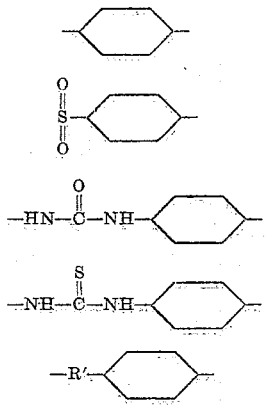

where R' is an alkyl group containing from 1 to 8 carbon atoms;

where R'' is an alkyl group containing from 1 to 6 carbon atoms, and

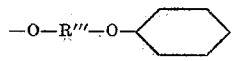

where R''' is an alkyl group containing from 1 to 6 carbon atoms.

As examples of suitable aromatic dibasic acids having the above general formula there may be named:

Terephthalic acid
p,p'-Dicarboxybiphenyl
p,p'-Dicarboxycarbanilide
p,p'-Dicarboxythiocarbanilide
p,p'-Dicarboxydiphenylsulfone
p-Carboxyphenoxyacetic acid
p-Carboxyphenoxypropionic acid
p-Carboxyphenoxybutyric acid
p-Carboxyphenoxyvaleric acid
p-Carboxyphenoxyhexanoic acid
p-Carboxyphenoxyheptanoic acid
p,p'-Dicarboxydiphenylmethane
p,p'-Dicarboxydiphenylethane
p,p'-Dicarboxydiphenylpropane
p,p'-Dicarboxydiphenylbutane
p,p'-Dicarboxydiphenylpentane
p,p'-Dicarboxydiphenylhexane
p,p'-Dicarboxydiphenylheptane
p,p'-Dicarboxydiphenyloctane
p,p'-Dicarboxydiphenoxymethane
p,p'-Dicarboxydiphenoxyethane
p,p'-Dicarboxydiphenoxypropane
p,p'-Dicarboxydiphenoxybutane
p,p'-Dicarboxydiphenoxypentane
p,p'-Dicarboxydiphenoxyhexane The aromatic dicarboxylic acid to be purified is mixed with the selected recrystallization solvent and the mixture is heated until solution occurs. The temperature at which complete solution takes place will depend upon whether N-methylpyrrolidone, 1,5-dimethylpyrrolidone, N-methylpiperidone or N-methylcaprolactam is being employed and upon the particular aromatic dicarboxylic acid being purified. Normally, a temperature within the range of 50° C. to 130° C. is sufficient to bring about complete solution of any of the acids listed hereinbefore. Upon cooling the solution to a temperature in the range of 10° C. to 45° C., the purified salt of the solvent and dibasic acid is precipitated and recovered by filtration.

Thereafter the salt is washed with hot water to regenerate the pure dibasic acid. Usually water at a temperature of about 10° C. to 100° C. is suitable for washing the salt. If desired, the salt may be washed with solvent, i.e., N-methylpyrrolidone, 1,5-dimethylpyrrolidone, N-methylpiperidone or N-methylcaprolactam, to remove adhering impurities prior to washing with hot water to regenerate the purified dibasic acid.

Very often the particular aromatic dicarboxylic acid to be purified may contain some existing and undesirable color which must be removed to prevent the color from appearing in the fibers and/or filaments prepared from the polyesters formed from the purified aromatic dicarboxylic acid. The color can easily be removed by employing activated carbon in the recrystallization solvent. Usually from 0.1 to 5 parts by weight of activated carbon, based on the weight of the recrystallization solvent, is sufficient.

When employing the process of the present invention, the yield is approximately 60 to 95 percent of the weight of the crude or unpurified aromatic dicarboxylic acid, and in those instances, where a product of highest purity is desired, it can be obtained by giving the purified aromatic dicarboxylic acid a second crystallization, and more, if desired.

In order to more clearly understand the process of the instant invention, reference should be had to the following specific examples which are merely intended to be illustrative and not limitative. In the examples, all parts and percents are by weight, unless otherwise indicated.

*Example I*

A mixture of 0.5 gram of crude terephthalic acid and 4.0 grams of N-methylpyrrolidone was heated to a temperature of 120° C., at which temperature a solution was obtained. Upon cooling the solution to a temperature of 30° C. crystals formed, which were found to be a salt of N-methylpyrrolidone and terephthalic acid. The salt crystals were filtered and washed thoroughly with boiling water to regenerate the purified terephthalic acid. Upon drying the purified crystals of terephthalic acid the yield was found to be 92%, based on the weight of the crude terephthalic acid.

*Example II*

A mixture of 0.5 gram of crude terephthalic acid and 4.0 grams of N-methylcaprolactam was heated to a temperature of 100° C., at which temperature solution occurred. Upon cooling the solution to a temperature of 25° C. crystals formed, which were found to be a salt of N-methylcaprolactam and terephthalic acid. The salt crystals were filtered and washed thoroughly with boiling water to regenerate the purified terephthalic acid. Upon drying a yield of 93%, based on the weight of the crude terephthalic acid, of purified terephthalic acid was obtained.

*Example III*

A mixture of 5 grams of p,p'-dicarboxydiphenoxybutane and 30 grams of N-methylpyrrolidone was heated to 120° C. to effect solution. Thereafter the solution was cooled to room temperature with the resultant formation of crystals of a salt of N-methylpyrrolidone and p,p'-dicarboxydiphenoxybutane. The salt crystals were filtered and washed with boiling water to liberate or regenerate the purified acid (p,p'-dicarboxydiphenoxybutane). A yield of 91%, based on the weight of the crude acid, was obtained.

*Example IV*

The procedure of Example III was repeated with p,p'-dicarboxydiphenoxyethane. A 90% yield of pure acid resulted.

*Example V*

A mixture of 30.0 grams of crude terephthalic acid and 300.0 grams of 1,5-dimethylpyrrolidone was heated to a temperature of 100° C., at which temperature a solution was obtained. Upon cooling the solution to a temperature of 30° C. crystals formed, which were found to be a salt of 1,5-dimethylpyrrolidone and terephthalic acid. The salt crystals were filtered and washed thoroughly with boiling water to regenerate the purified terephthalic acid. Upon drying the purified crystals of terephthalic acid the yield was found to be 68%, based on the weight of the crude terephthalic acid.

It has been found that the salts formed by reaction of the N-methylpyrrolidone, 1,5-dimethylpyrrolidone, N-methylpiperidone and N-methylcaprolactam with the various dicarboxylic acids, listed hereinbefore, contain approximately 2 moles of solvent to 1 mole of acid. It has also unexpectedly been found that the salts formed by reaction of the instant recrystallization solvents and terephthalic acid can be employed directly in condensation polymerization reactions with ethylene glycol, and the like, and such process is the subject of copending application, Serial No. 446,955, filed on even date herewith, and now Patent No. 2,719,835.

The present invention provides a simple and economic method for purifying the aromatic dicarboxylic acids which are useful in the manufacture of condensation polymerization products. The present method alleviates the difficulties encountered in prior chemical methods of purification. The present method is economical in that conventional equipment can be employed and no special expensive stainless steel pressure equipment is needed as in the case where the acids are converted to esters. After separation of the purified acid, the recrystallization solvent can be recovered by conventional distillation procedures, and the like, and reused, thus reducing the cost of the process. Numerous other advantages of the instant invention will be readily apparent to those skilled in the art.

It is to be understood that changes and variations may be made without departing from the spirit and scope of the invention as defined in the appended claims.

I claim:

1. A process for purifying aromatic dicarboxylic acids having the formula:

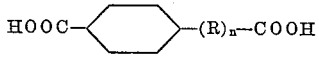

wherein $n$ is an integer from zero to one, inclusive, and R is a radical selected from the group consisting of

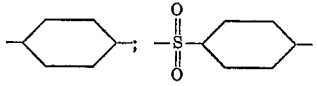

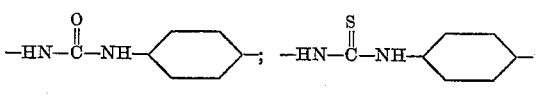

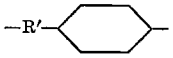

where R' is an alkyl group containing from 1 to 8 carbon atoms; —O—R''— where R'' is an alkyl group containing from 1 to 6 carbon atoms; and

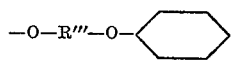

where R''' is an alkyl group containing from 1 to 6 carbon atoms, which comprises dissolving the acid in a recrystallization solvent selected from the group consisting of N-methylpyrrolidone, 1,5-dimethylpyrrolidone, N-methylpiperidone and N-methylcaprolactam at a temperature in the range of 30° C. to 130° C. to form the salt of the solvent and dicarboxylic acid, cooling the solution to crystallize the salt, filtering to remove the crystallized salt, and washing the salt with hot water to regenerate the purified aromatic dicarboxylic acid.

2. The process as defined in claim 1 wherein from 0.1 to 5 parts of activated carbon are added to the hot solution with stirring and thereafter the hot solution is filtered to remove the carbon prior to cooling said solution.

3. The process as defined in claim 1 wherein the aromatic dicarboxylic acid is terephthalic acid.

4. The process as defined in claim 1 wherein the aromatic dicarboxylic acid is p,p'-dicarboxydiphenoxybutane.

5. The process as defined in claim 1 wherein the aromatic dicarboxylic acid is p,p'-dicarboxydiphenoxyethane.

6. The process as defined in claim 1 wherein the aromatic dicarboxylic acid is p,p'-dicarboxythiocarbanilide.

7. The process as defined in claim 1 wherein the aromatic dicarboxylic acid is p-carboxyphenoxyacetic acid.

8. The process as defined in claim 1 wherein the recrystallization solvent is N-methylpyrrolidone.

9. The process as defined in claim 1 wherein the recrystallization solvent is 1,5-dimethylpyrrolidone.

10. The process as defined in claim 1 wherein the recrystallization solvent is N-methylpiperidone.

11. The process as defined in claim 1 wherein the recrystallization solvent is N-methylcaprolactam.

12. A process for purifying aromatic dicarboxylic acids having the formula:

wherein $n$ is an integer from zero to one, inclusive, and R is a radical selected from the group consisting of

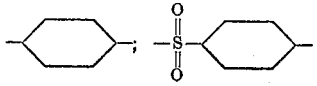

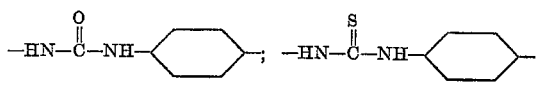

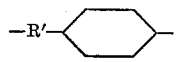

where R' is an alkyl group containing from 1 to 8 carbon atoms; —O—R''— where R'' is an alkyl group containing from 1 to 6 carbon atoms; and

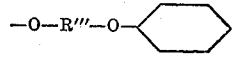

where R''' is an alkyl group containing from 1 to 6 carbon atoms, which comprises dissolving the acid in a recrystallization solvent selected from the group consisting of N-methylpyrrolidone, 1,5-dimethylpyrrolidone, N-methylpiperidone and N-methylcaprolactam, at a temperature in the range of 50° to 130° C. to form the salt of the solvent and dicarboxylic acid, cooling the solution to a temperature in the range of 10° to 45° C. to crystallize the salt, filtering to remove the crystallized salt, and washing the salt with hot water to regenerate the purified aromatic dicarboxylic acid.

13. The process as defined in claim 12 wherein from 0.1 to 5 parts of activated carbon are added to the hot solution with stirring and thereafter the hot solution is filtered to remove the carbon prior to cooling said solution.

References Cited in the file of this patent

UNITED STATES PATENTS

| | | |
|---|---|---|
| 2,664,440 | Toland | Dec. 29, 1953 |
| 2,732,399 | Carlston et al. | Jan. 24, 1956 |
| 2,742,496 | Lum et al. | Apr. 17, 1956 |

OTHER REFERENCES

Walker: J. of App. Chem., vol. 2 (1952), pp. 470, 474 and 476.